United States Patent
Ritter et al.

(10) Patent No.: US 7,303,236 B2
(45) Date of Patent: Dec. 4, 2007

(54) CABLE OPERATED SLIDER FOR VEHICLE SEATS

(75) Inventors: Michael Allen Ritter, Tyler, TX (US); Bobby Leo Woodward, Mabank, TX (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 11/070,156

(22) Filed: Mar. 1, 2005

(65) Prior Publication Data

US 2006/0197365 A1 Sep. 7, 2006

(51) Int. Cl.
A47C 1/023 (2006.01)
F16M 13/00 (2006.01)

(52) U.S. Cl. .................. 297/344.11; 248/429

(58) Field of Classification Search ............. 297/344.1, 297/344.13, 344.19, 344.21, 344.11, 354.12, 297/367, 375, 378.12
See application file for complete search history.

(56) References Cited

U.S. PATENT DOCUMENTS

| | | | | |
|---|---|---|---|---|
| 3,730,019 A * | 5/1973 | Ballard | .............. | 297/354.12 X |
| 4,765,681 A * | 8/1988 | Houghtaling et al. | ....... | 297/367 |
| 4,887,864 A * | 12/1989 | Ashton | ....................... | 297/375 |
| 5,052,751 A * | 10/1991 | Hayakawa et al. | ..... | 248/429 X |
| 5,082,328 A | 1/1992 | Garelick | | |
| 5,419,616 A * | 5/1995 | Paetzold | ................ | 297/378.12 |
| 5,516,071 A * | 5/1996 | Miyauchi | .................... | 248/429 |
| 5,520,362 A * | 5/1996 | Gerlach | ....................... | 248/429 |
| 5,702,084 A * | 12/1997 | Carnahan et al. | ........... | 248/416 |
| 5,762,309 A * | 6/1998 | Zhou et al. | ......... | 297/344.11 X |
| 5,762,617 A * | 6/1998 | Infanti | ......................... | 601/49 |
| 5,791,731 A * | 8/1998 | Infanti | ..................... | 297/217.3 |
| 5,797,575 A * | 8/1998 | Clausen | ...................... | 248/429 |
| 5,813,726 A * | 9/1998 | Husted | ................... | 248/429 X |
| 5,853,221 A * | 12/1998 | Thoman et al. | ........ | 297/344.24 |
| 5,884,887 A | 3/1999 | Garelick et al. | | |
| 5,927,809 A * | 7/1999 | Tame | ................ | 297/344.11 X |
| 6,158,800 A * | 12/2000 | Tsuge et al. | ........ | 297/378.12 X |
| 6,457,775 B2 * | 10/2002 | Timon | ................... | 297/344.11 |
| 6,767,063 B1 * | 7/2004 | Abdella et al. | ..... | 297/344.11 X |
| 6,827,404 B2 * | 12/2004 | Blair et al. | ......... | 297/344.11 X |
| 6,935,692 B2 * | 8/2005 | Nishide et al. | ........ | 297/344.11 |
| 7,025,419 B2 * | 4/2006 | Sasaki et al. | .......... | 297/344.11 |
| 7,036,885 B2 * | 5/2006 | Ganot et al. | ........ | 297/344.11 X |

* cited by examiner

*Primary Examiner*—Rodney B. White
*Assistant Examiner*—Stephen Vu
(74) *Attorney, Agent, or Firm*—Hanley Flight & Zimmerman, LLC

(57) ABSTRACT

Apparatus for operation of a vehicle seat slider are disclosed. A disclosed apparatus includes a cable assembly having a first end and a second end. The first end of the cable assembly is configured to be operatively coupled to a slider mechanism of a vehicle seat. A release member is operatively coupled to the second end of the cable assembly so that the slider mechanism is urged toward a locked condition in the absence of a force being applied to the release member by a person.

35 Claims, 5 Drawing Sheets

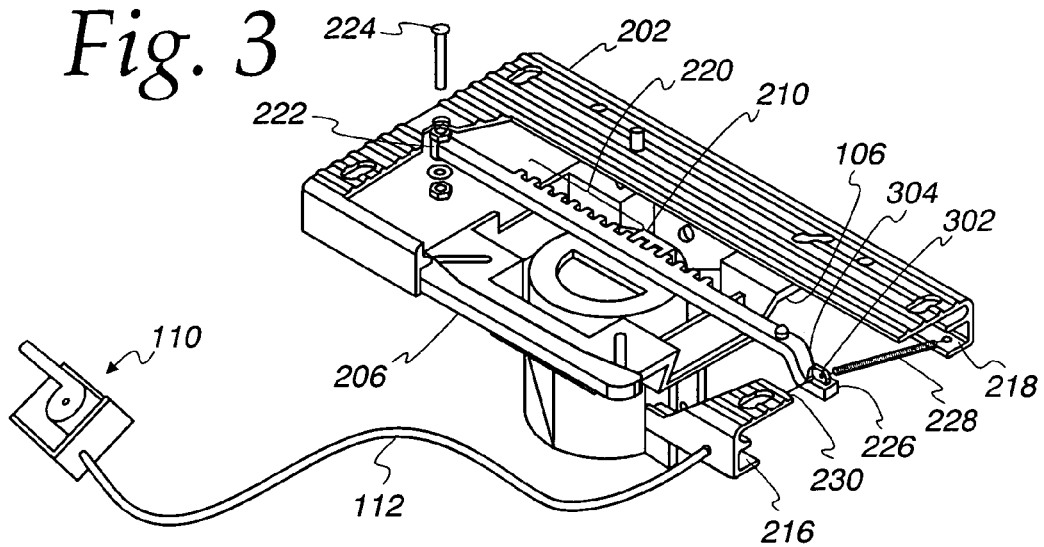
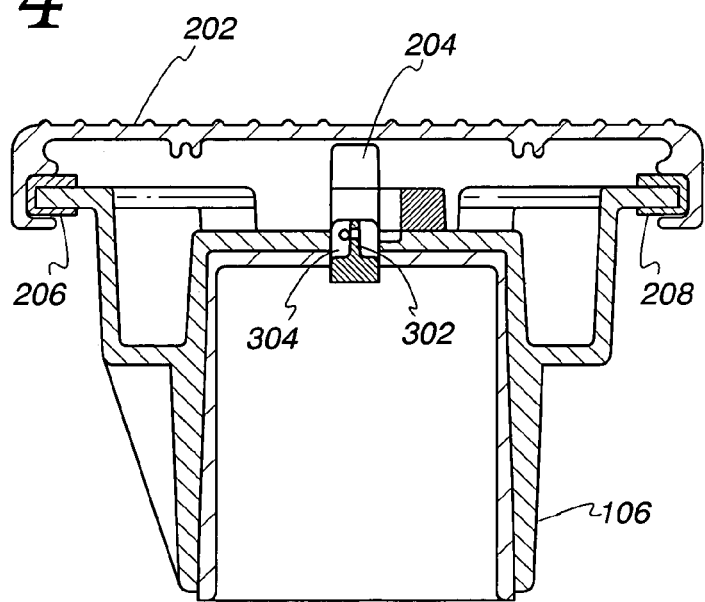

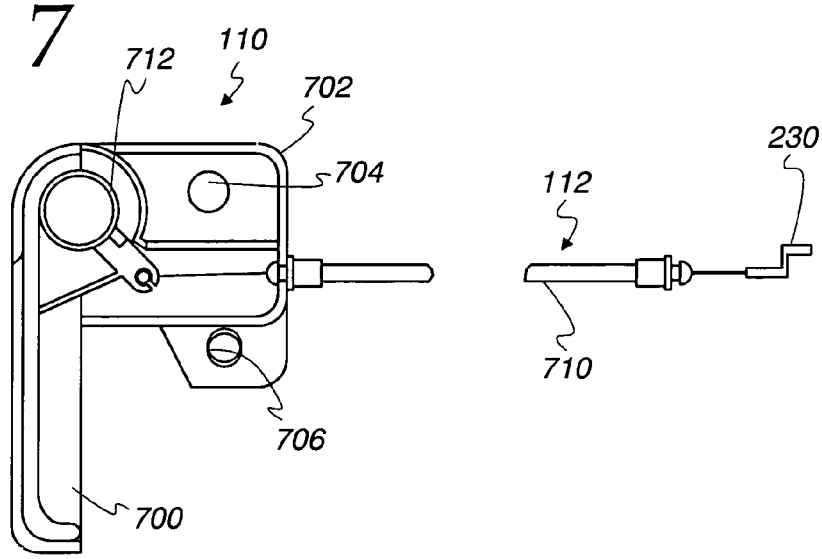
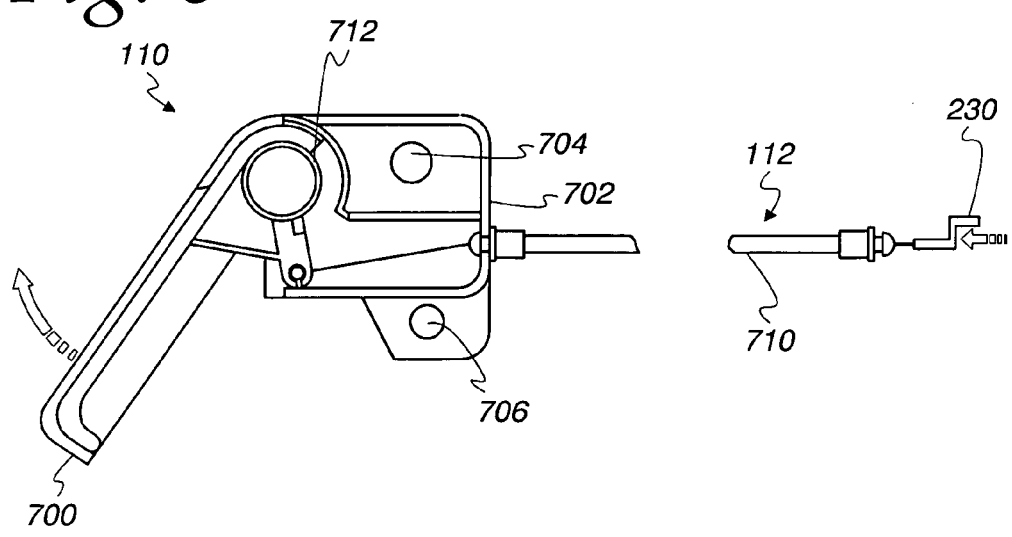

CABLE OPERATED SLIDER FOR VEHICLE SEATS

FIELD OF THE DISCLOSURE

The present disclosure relates generally to vehicle seats and, more specifically, to a cable operated vehicle seat slider.

BACKGROUND

Many vehicle seats such as those used in automobiles, boats, industrial or commercial vehicles, etc. include a seat slider or slider mechanism that enables a seated vehicle occupant to adjust their seat to a desired position along a generally fore/aft axis or direction. Use of the slider mechanism typically occurs prior to vehicle operation to enable, for example, an operator of the vehicle (e.g., a driver) to adjust the position their seat for ease of use of vehicle controls, comfort, safety, etc.

Typically, vehicle seat slider mechanisms are operated via a lever, knob, or other similar mechanical member that is directly or rigidly coupled to the slider mechanism. Additionally, the lever, knob, or other member for operating the seat slider mechanism is typically located in close proximity to the seat and its slider mechanism so that a seated vehicle occupant can easily operate the slider mechanism. For example, in the case of automobiles and boats, a lever or knob for operating (e.g., locking/unlocking) the seat slider mechanism is often located near the front lower portion of the seat bottom behind the calves of a seated person.

The above-noted direct and proximate relationship between the slider mechanism controls (e.g., levers, knobs, etc.) results in a relatively low overall seat cost and provides a relatively high degree of occupant safety. In particular, such known mechanical slider controls use relatively few parts that are unlikely to bind, seize, or otherwise impede the return of the slider mechanism to a locked condition following an adjustment by the occupant. Leaving a seat in an unlocked condition is unsafe for operation of the vehicle and could, for example, significantly increase the likelihood of injury to an occupant during an accident (e.g., a collision).

Unfortunately, in the case of boats, for example, a wide range of seat designs and seating layouts typically requires boat manufacturers to inventory a wide range of seat slider mechanisms and related operating or control members such as knobs, levers, etc. Further, the wide range of seat designs and layouts results in a wide range of slider controls locations, which can result in controls that may be significantly less intuitive for vehicle occupants to operate.

Some automobiles and boats have employed electrically operated seat slider mechanisms. Such electrically operated slider mechanisms are controlled via electric switches that can be mounted virtually anywhere within reach of the seat occupant, including on the seat, a dashboard, a counsel, etc. Although such electrically operated slider mechanisms enable more flexible (e.g., remote or not on the seat) location of seat slider controls, such electric controls require relatively expensive and heavy electric motors and are prone to failure, particularly in marine applications, which tend to involve relatively corrosive environments.

BRIEF DESCRIPTION OF THE DRAWINGS

FIG. 3 is a perspective view of the example seat slider mechanism of FIGS. 1 and 2 that has been cut away to better illustrate its operation.

FIG. 4 is a detailed cross-sectional view of the example seat slider mechanism of FIGS. 1-3.

FIGS. 7 and 8 illustrate an example operating lever that may be used with the example seat slider mechanism described herein.

DETAILED DESCRIPTION

In general, the example seat slider mechanism described herein enables a single seat slider mechanism to be used for a wide variety of vehicle seat designs and layouts. More specifically, the example seat slider mechanism described herein is operated via a flexible coupling such as, for example, a cable assembly or the like so that an operating lever, control lever, knob, or other control member which a vehicle occupant uses to unlock/lock the slider to adjust the seat can be located in a variety of locations without requiring different slider mechanism and control lever designs.

More specifically, the example seat slider mechanism described herein provides an unlocked condition in which a vehicle seat can be slidably adjusted along, for example, a fore/aft axis or direction by an occupant of the seat or other person and a locked condition in which the vehicle seat is fixed (i.e., substantially immovable) along the fore/aft axis or direction. The example seat slider mechanism described herein uses a locking lever or member that is springably biased (e.g., using a spring or other resilient member) so that the seat slider is urged toward the locked condition in the absence of a force being applied to the operating lever, control knob, etc. by the seat occupant or other person. To unlock the seat slider mechanism, the seat occupant or other person applies a force to (e.g., pulls, pushes, etc.) the operating lever, which conveys a force via the cable assembly or other flexible coupling to the locking lever to overcome the bias and urge the locking lever away from the locked condition. When the seat occupant or other person ceases to apply force to the operating lever, the springably biased locking member automatically returns to the locked condition.

In an example seat slider mechanism, the locking lever is biased using a bias element such as a spring that is operatively coupled to the locking lever. Alternatively or additionally, a bias element or spring can be operatively coupled to the operating lever to provide a force via the flexible coupling or cable assembly that urges the locking lever toward the locked condition. In the case where multiple bias elements or springs are used, an added measure of safety is provided because the failure of one bias element or spring will not inhibit or prevent the locking lever and, thus, the seat slider mechanism from returning to the locked condition.

Figure 1:
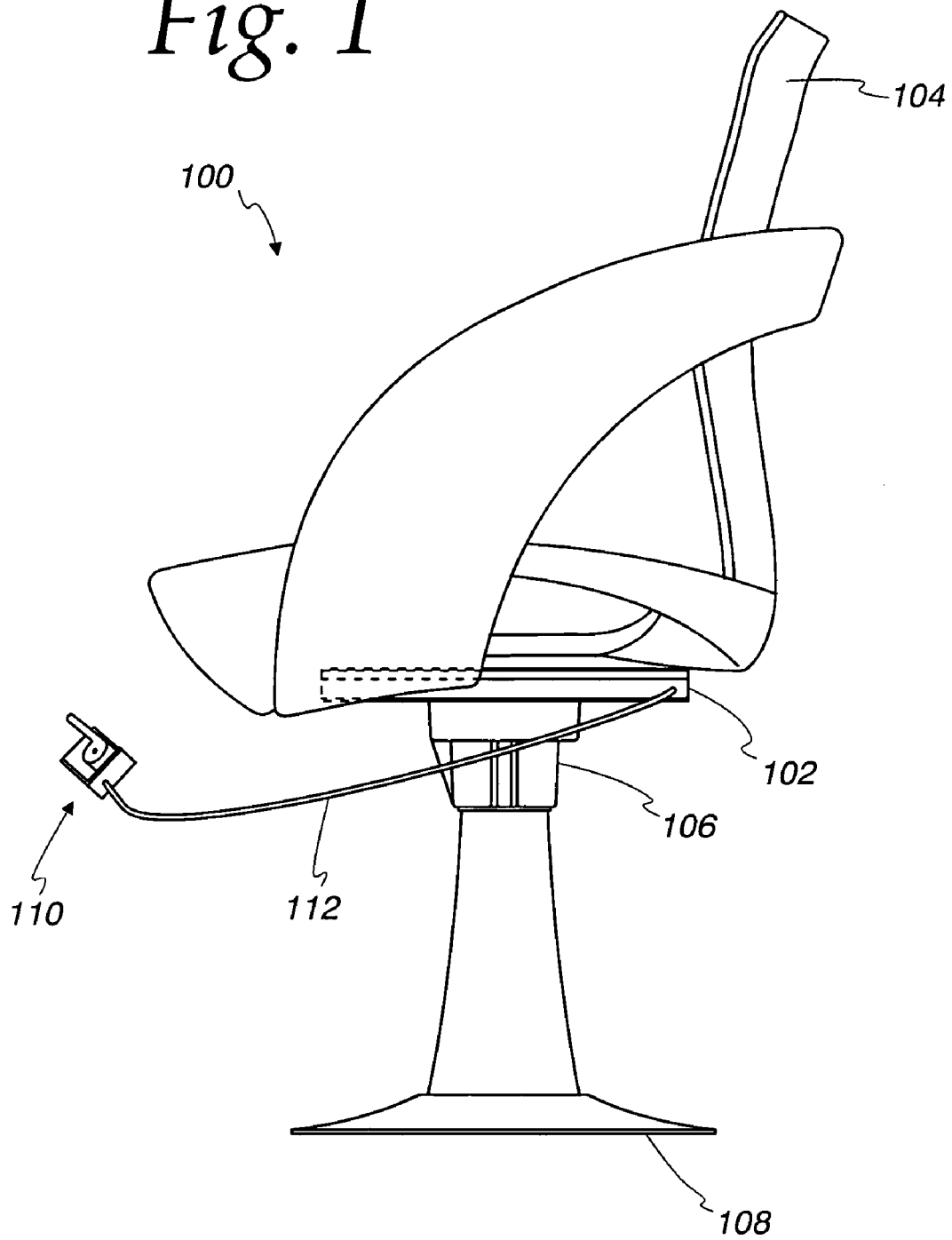
FIG. 1 depicts an example vehicle seat assembly including the example seat slider mechanism described herein.

FIG. 1 depicts an example vehicle seat assembly 100 including the example seat slider mechanism 102 described herein. As shown in FIG. 1, a vehicle seat 104 is coupled or mounted to the example seat slider mechanism 102 via a seat mount 106. The seat mount 106 is coupled to a mounting base 108 which, in turn, may be coupled or fixed to a floor surface of a vehicle (not shown). The vehicle seat assembly 100 may be configured for use in any desired type of vehicle including, for example, a boat, a car, a recreational vehicle, heavy equipment, etc. Additionally, the vehicle seat 104 is configured (e.g., sized, shaped, utilizes materials, etc.) to suit the particular vehicle in which the example vehicle seat assembly 100 is to be mounted. As described in greater detail below, the example vehicle seat assembly 100 also includes an operating or release lever or member 110 that is operatively coupled to the seat slider mechanism 102 via a flexible coupling 112 such as, for example, a cable assembly. The operating lever or member 110 can be manually actuated by an occupant of the vehicle seat 104 to enable the vehicle seat 104 to freely slide or move in a generally fore/aft direction or axis with respect to the vehicle in which the vehicle seat assembly 100 is mounted. More specifically, the example seat slider mechanism 102 is configured to provide a locked condition in which the vehicle seat 104 is substantially prevented from sliding or moving in a fore/aft direction and an unlocked condition in which the position of the vehicle seat 104 can be slidably adjusted within the vehicle. The slider mechanism 102 and/or the operating lever 110 include resilient or springably biased member(s) to bias the slider mechanism 102 in a locked condition. Thus, actuation of (e.g., manual application of a force to) the operating lever or member 110 by a person works against the bias to cause the example seat slider mechanism 102 to unlock, thereby enabling the vehicle seat 104 to slidably move. Then, when the operating lever 110 is released by the person (i.e., the person ceases to apply force to the operating lever 110), the resilient or springably biased members cause the example seat slider mechanism 102 to automatically return to the locked condition.

The flexible coupling 112 enables the operating lever or member 110 to be mounted in virtually any location within the vehicle, including on the vehicle seat assembly 100 or another surface within the vehicle that is remote from the vehicle seat assembly 100. Thus, the location of the operating lever 110 within the vehicle can be easily varied to accommodate a particular vehicle and/or vehicle seat configuration, a preference of the vehicle owner, etc. In this manner, a single configuration of the example seat slider mechanism 102 can be used with a wide variety of vehicle seats, vehicle seat arrangements, vehicle configurations, etc.

Figure 2:
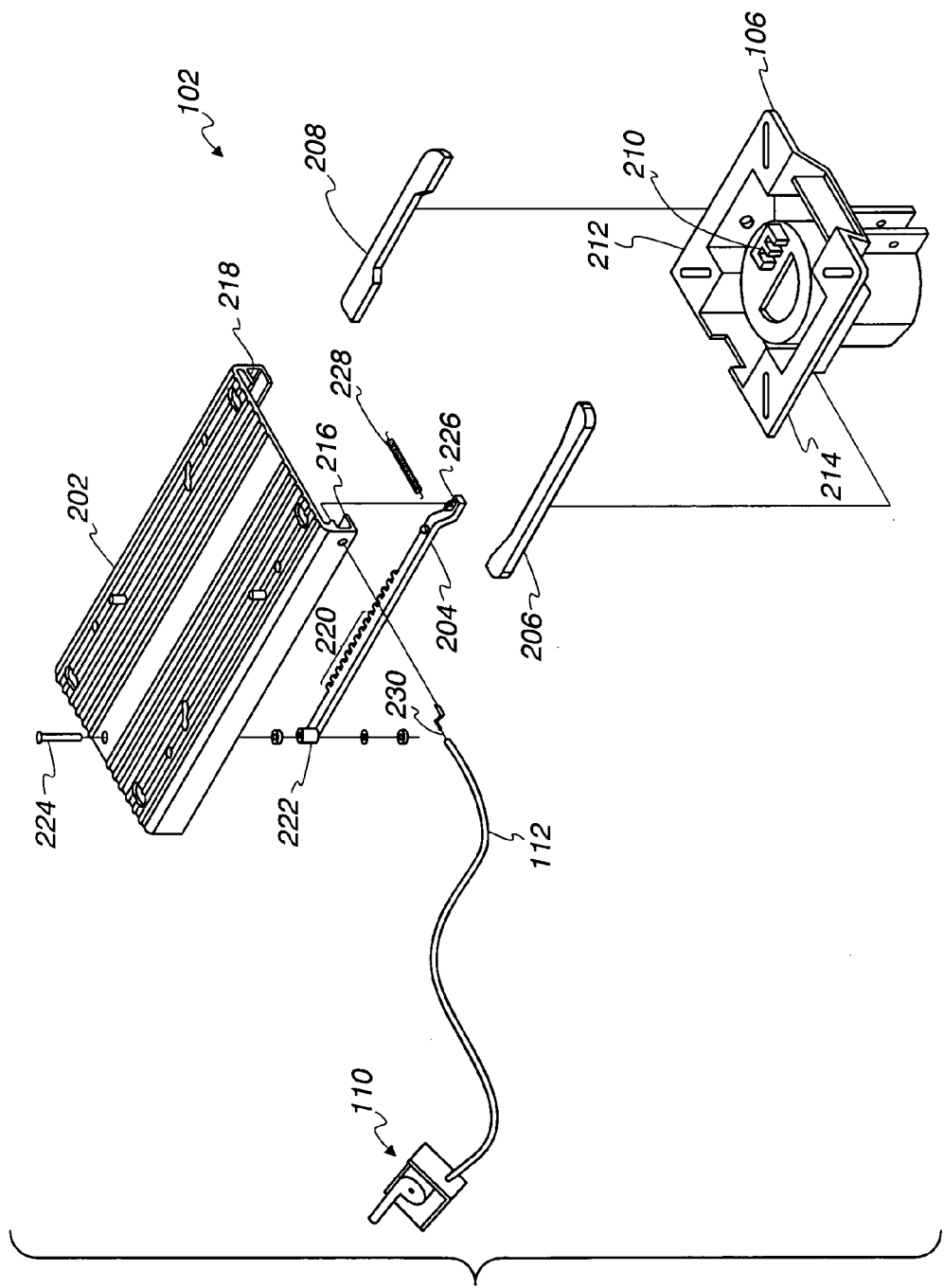
FIG. 2 is a more detailed exploded assembly view of the example seat slider mechanism of FIG. 1.
Figure 5:
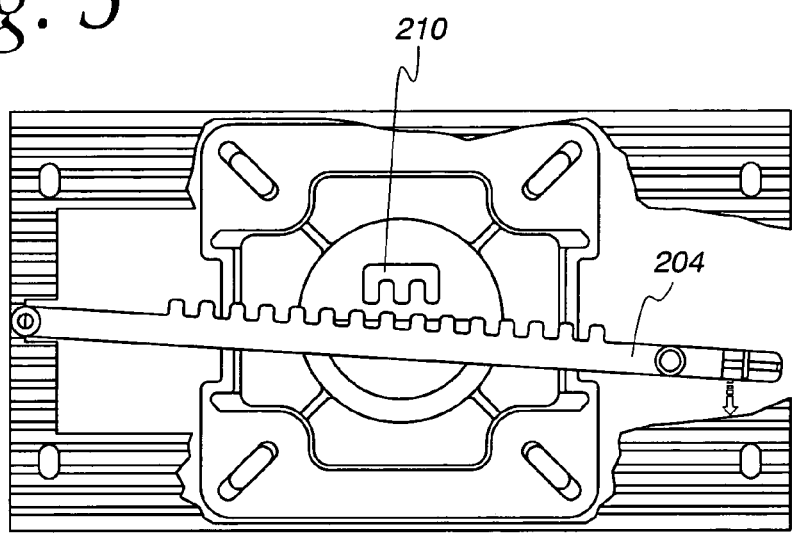
FIGS. 5 and 6 are plan views of the example seat slider mechanism of FIGS. 1-4 that have been cut away to illustrate the manner in which the locking lever engages with the locking lug or member.
Figure 6:
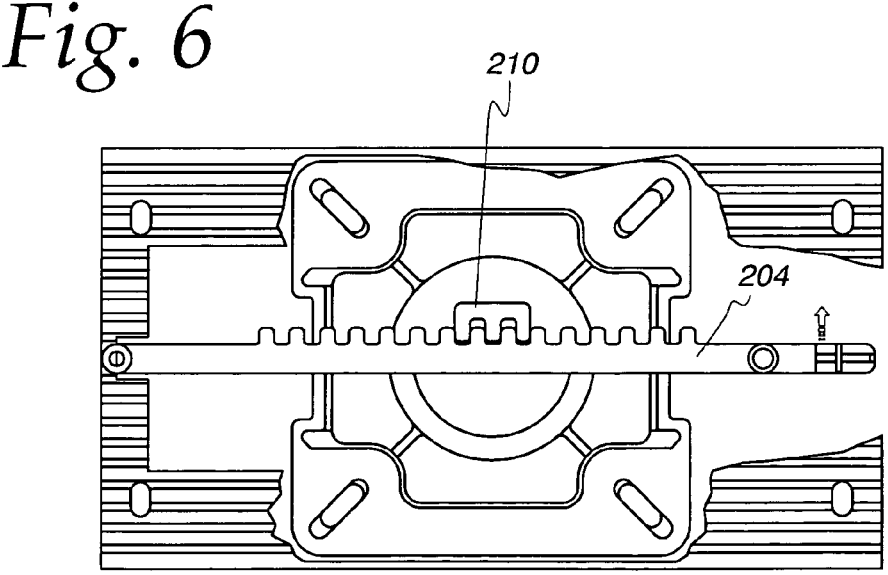

FIG. 2 is a more detailed exploded assembly view of the example seat slider mechanism 102 of FIG. 1. The example seat slider mechanism 102 includes a slider plate 202 to which a vehicle seat (e.g., the vehicle seat 104) can be mounted, a locking lever or member 204, slider guides or guide members 206 and 208, and a locking lug or member 210 that is fixed to (e.g., integrally formed with) the seat mount 106 (FIG. 1). The inwardly facing edges of the slider guides 206 and 208 may be slotted or otherwise configured to be fixed to edges 212 and 214 of the seat mount 106. The slider plate 202 includes channels 216 and 218 configured to slidably engage the slider guides 206 and 208. In one example, the slider guides 206 and 208 are made of a thermoplastic material that provides a relatively low friction outer surface to facilitate the sliding of slider plate 202 over the guides 206 and 208 when the seat slider mechanism 102 is in an unlocked condition. In this example, the slider guides 206 and 208 may be pressed onto, glued, riveted, screwed, bolted, or fixed in any other manner to the edges 212 and 214 of the seat mount 106.

In the example of FIG. 2, the locking lever or member 204 is relatively elongate and includes a plurality of locking structures, raised portions or teeth 220. A first end 222 of the locking lever 204 is pivotally coupled to the slider plate 202 via a fastener 224. A second end 226 of the locking lever 204 is coupled to a return spring 228 to urge or springably bias the locking lever 204 toward a locked condition. As more clearly shown in FIG. 3, in the locked condition, one or more of the plurality of teeth or raised portions 220 engages with at least one recess of the locking lug 210 to prevent slidable movement of the slider plate 202 and, thus, any vehicle seat mounted thereto.

An end 230 of the flexible coupling 112 is configured to be coupled to the second end 226 of the locking lever 204 so that actuation of the operating lever or member 110 works against the spring 228 to move the teeth 220 of the locking lever 204 away from the locking lug 210, thereby causing the slider mechanism 102 to be in an unlocked condition and enabling slidable movement of the slider plate 202 and any vehicle seat mounted thereto.

FIG. 3 is a perspective view of the example seat slider mechanism 102 of FIGS. 1 and 2 that has been cut away to better illustrate its operation. In the example of FIG. 3, the teeth or raised portions 220 of the locking lever 204 are engaged with the locking lug 210 to slidably lock the slider plate 202 to the seat mount 106. As can also be seen in FIG. 3, the first end 226 of the locking lever 204 includes tabs 302 and 304 that are configured to receive the return spring 228 and the end 230 of the flexible coupling or cable assembly 112. The return spring 228 urges the locking lever 204 toward a locked condition in which one or more of the teeth or protrusions 220 of the locking lever 204 are engaged with the locking lug or member 210. Actuation of the operating lever 110 causes the end 230 of the flexible coupling or cable assembly 112 to pivotally move the teeth or protrusions 220 of the locking lever 204 away from engagement with the locking lug 210, thereby enabling slidable movement of the plate 202 and any vehicle seat mounted thereto.

FIG. 4 is a detailed cross-sectional view of the example seat slider mechanism 102 of FIGS. 1-3, and FIGS. 5 and 6 are plan views of the example seat slider mechanism 102 of FIGS. 1-4 that have been cut away to illustrate the manner in which the locking lever 204 engages with the locking lug or member 210.

FIGS. 7 and 8 illustrate an example implementation of the operating lever 110 that may be used with the example seat slider 102 mechanism (FIG. 1) described herein. The operating lever 110 includes a handle or lever 700 that is pivotally mounted to a housing or mounting member 702. While the example of FIGS. 7 and 8 depict the use of a handle or lever, any other suitable structure such as, for example, a rotatable or pullable knob, could be used instead. The mounting member 702 includes mounting holes 704 and 706 that may be used to fix the operating lever 110 to a portion of a vehicle (e.g., a portion of a vehicle seat or any other surface within the vehicle). In the example of FIGS. 7 and 8, the flexible coupling 112 is depicted as being a cable assembly having a cable 708 at least partially covered by a jacket or sheath 710.

When the handle 700 is in the position shown in FIG. 7, the end 230 of the cable 708 is extended, thereby enabling the return spring 228 to bias the one or more of the teeth 220 of the locking lever 204 into engagement with the locking lug 210, thereby locking the slider plate 202 to the seat mount 106 (FIG. 1) to prevent slidable movement of the slider plate 202 relative to the seat mount 106. When the handle 700 is in the position shown in FIG. 8, the end 230 of the cable 708 is retracted toward the handle 700, thereby working against the return spring 228 to move the locking lever 204 out of engagement with the locking lug 210 to enable slidable movement of the slider plate 202 and any vehicle seat mounted thereto.

In addition to or as an alternative to the return spring 228 (FIG. 2), the operating lever 110 may include a torsion spring or other resilient member 712 to bias the handle 700, the cable end 230 and, thus, the locking lever 204 (FIG. 2) in the locked condition. In the case where the torsion spring or other resilient member 712 is included in addition to the return spring 228, the forces applied to the locking lever 204 by the return spring 228 and the torsion spring 712 are additive. As a result, an added measure of safety is provided in the event that one of the springs or resilient members 228 and 712 fails and/or in the event that movement of the cable 708 is impeded by frictional engagement with the sheath 710 or the like.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. An apparatus for adjusting a position of a vehicle seat, comprising:
    a slider mechanism adapted to be operatively coupled to the vehicle seat;
    a cable assembly having a first end and a second end, wherein the first end is operatively coupled to the slider mechanism;
    a release member operatively coupled to the second end of the cable assembly so that the slider mechanism is urged toward a locked condition in the absence of a force being applied to the release member by a person;
    a first bias member exerting a first force on the first end of the cable assembly;
    a second bias member exerting a second force in addition to the first force on the second end of the cable assembly and urging the slider mechanism toward the locked condition; and
    wherein the slider mechanism includes a locking lever, and wherein the first end of the cable assembly is operatively coupled directly to the locking lever so that when a force is applied to the cable assembly via the release member the locking lever is moved away from or toward the locked condition.

2. An apparatus as defined in claim 1, wherein the first bias member is operatively coupled to the slider mechanism.

3. An apparatus as defined in claim 1, wherein the second bias member is operatively coupled to the release member.

4. An apparatus as defined in claim 1, wherein the first and second bias members are springs.

5. An apparatus as defined in claim 1, wherein the locking lever has a first end configured to form a pivot, a second end configured to be operatively coupled to the first end of the cable assembly, and a plurality of locking structures spaced along a length of the locking lever.

6. An apparatus as defined in claim 1, wherein the locking lever is biased toward the locked condition.

7. An apparatus as defined in claim 6, further comprising a spring operatively coupled to the locking lever to bias the locking lever toward the locked condition.

8. An apparatus as defined in claim 1, wherein the slider mechanism includes a locking lever having a protrusion configured to engage a locking member associated with a seat mount.

9. An apparatus as defined in claim 8, wherein the locking lever includes a plurality of protrusions configured to engage the locking member.

10. An apparatus as defined in claim 8, wherein the locking member includes at least one recess configured to receive the protrusion.

11. An apparatus as defined in claim 8, wherein the locking member is integrally formed with the seat mount.

12. An apparatus as defined in claim 1, wherein the cable assembly includes a cable and a sheath surrounding at least a portion of a length of the cable.

13. An apparatus as defined in claim 1, wherein the release member is one of a handle, a lever, or a knob configured to be actuated by a person.

14. An apparatus as defined in claim 1, wherein the release member is configured to be mounted to a surface within the vehicle.

15. An apparatus as defined in claim 14, wherein the surface is not a surface of the vehicle seat.

16. An apparatus for adjusting a position of a vehicle seat, comprising:
    a seat slider mechanism;
    a cable having a first end operatively coupled to the seat slider mechanism;
    a control member operatively coupled to a second end of the cable, wherein the control member is configured to apply a force to the cable to cause the seat slider mechanism to unlock, and wherein the control member is configured to be mounted on a surface that is not a surface of the vehicle seat;
    wherein the slider mechanism includes a locking member, and wherein the first end of the cable is operatively coupled directly to the locking member so that when a force is applied to the cable assembly via the release member the locking member is moved away from or toward a locked condition; and
    wherein the locking member has a first end configured to form a pivot, a second end configured to be operatively coupled directly to the first end of the cable, and a plurality of locking structures spaced along a length of the locking member.

17. An apparatus as defined in claim 16, wherein the locking member is springably biased.

18. An apparatus as defined in claim 17, wherein the locking member is springably biased toward the locked condition.

19. An apparatus as defined in claim 16, wherein the control member is springably biased to urge the seat slider mechanism toward the locked condition.

20. An apparatus as defined in claim 16, wherein the seat slider mechanism enables fore and aft adjustment of the vehicle seat.

21. An apparatus as define in claim 20, wherein the vehicle seat is a boat seat.

22. A vehicle seat, comprising:
    a slider mechanism configured to provide an unlocked condition in which the vehicle seat is enabled to slidably move and a locked condition in which the vehicle seat is unable to slidably move;
    an operating lever configured to be mounted to a surface that is not a vehicle seat surface;
    a substantially flexible coupling operatively coupled to the slider mechanism and the operating lever so that a manual force applied to the operating lever urges the slider mechanism toward the unlocked condition
    wherein the slider mechanism includes a locking member, and wherein the first end of the cable is operatively coupled directly to the locking member so that when a force is applied to the cable assembly via the release member the locking member is moved away from or toward a locked condition; and wherein the locking member has a first end configured to form a pivot, a second end configured to be operatively coupled directly to the first end of the cable, and a plurality of locking structures spaced along a length of the locking member.

23. A vehicle seat as defined in claim 22, wherein the substantially flexible coupling comprises a cable assembly having a first end operatively coupled to the slider mechanism and a second end operatively coupled to the operating lever.

24. A vehicle seat as defined in claim 22, wherein slider mechanism comprises a locking mechanism configured to provide the locked condition and the unlocked condition.

25. A vehicle seat as defined in claim 24, wherein the locking mechanism comprises a bias mechanism to bias the locking mechanism toward the locked condition.

26. A vehicle seat as defined in claim 25, wherein the locking mechanism comprises a spring configured to bias the locking mechanism toward the locked condition.

27. An apparatus for adjusting a position of a seat, comprising:

means for adjusting a position of a seat, wherein the means for adjusting is configured to be mechanically coupled to the seat and has a locked condition and an unlocked condition;

means for unlocking the means for adjusting to enable movement of the seat, wherein the means for unlocking is configured to be manually operated by a person;

means for flexibly mechanically coupling the means for adjusting directly to the means for unlocking so that when the means for unlocking is manually operated by the person, the means for adjusting is urged to the unlocked condition and when the means for unlocking is not manually operated by the person, the means for adjusting is urged to the locked condition;

a means for biasing the means for unlocking mechanically coupled to the means for unlocking and configured to exert a first force on a first portion of the means for flexibly mechanically coupling; and a means for biasing the means for adjusting mechanically coupled to the means for adjusting and configured to exert a second force in addition to the first force on a second portion of the means for flexibly mechanically coupling to urge the slider mechanism toward the locked condition.

28. An apparatus as defined in claim 27, wherein the means for unlocking comprises means for mounting the means for unlocking.

29. An apparatus as defined in claim 27, wherein the means for mounting is configured to mount the means for unlocking to a surface other than a seat surface.

30. An apparatus as defined in claim 27, wherein the means for biasing the means for unlocking comprises a spring.

31. An apparatus as defined in claim 27, wherein the means for adjusting comprises means for locking the position of the seat.

32. A vehicle seat as defined in claim 22, wherein the surface is a vehicle surface other than the vehicle seat surface.

33. A slider assembly comprising:

a seat mount;

at least one slider guide mounted to the seat mount;

a locking lug mounted to the seat mount and including at least one recess;

a slider plate to which a vehicle seat can be mounted, the slider plate including at least one channel for slidably engaging the at least one slider guide such that the slider plate is slidable between a first position and a second position relative to the seat mount;

a locking lever pivotally coupled to the slider plate and including at least one locking structure, wherein the locking lever is biased toward a locked position wherein the at least one locking structure engages the at least one recess of the locking lug to prevent the slider plate from moving relative to the seat mount;

a cable having a first end operatively coupled directly to the locking lever;

a control member operatively coupled to a second end of the cable, wherein the control member is configured to apply a force to the cable to cause the locking lever to pivot toward an unlocked position wherein the at least one locking structure disengages the at least one recess of the locking lug to allow the slider plate to move relative to the seat mount;

a first bias member configured to exert a first force on the first end of the cable; and a second bias member configured to exert a second force in addition to the first force on the second end of the cable.

34. A slider assembly as defined in claim 33, wherein a plane defined by each of the at least one slider guide, the locking lug, the slider plate, and the locking lever is substantially parallel to a plane defined by the seat mount.

35. A slider assembly as defined in claim 33, wherein the locking lever pivots in a plane substantially parallel to a plane defined by the slider plate.

* * * * *

UNITED STATES PATENT AND TRADEMARK OFFICE
CERTIFICATE OF CORRECTION

| | | |
|---|---|---|
| PATENT NO. | : 7,303,236 B2 | Page 1 of 1 |
| APPLICATION NO. | : 11/070156 | |
| DATED | : December 4, 2007 | |
| INVENTOR(S) | : Ritter et al. | |

It is certified that error appears in the above-identified patent and that said Letters Patent is hereby corrected as shown below:

Cover page:
item (73), delete "Brunswich Corporation, Lake Forest, IL (US)" and insert
-- Brunswick Corporation, Lake Forest, IL (US) --.

Signed and Sealed this

Fifth Day of May, 2009

JOHN DOLL
*Acting Director of the United States Patent and Trademark Office*